Dec. 23, 1969  H. A. McMASTER  3,485,612
METHOD AND APPARATUS FOR HEAT TREATING GLASS
ON A GAS SUPPORT BED
Filed May 9, 1966  5 Sheets-Sheet 1

INVENTOR.
Harold A. McMaster
BY
Barnard, McLynn & Rising
ATTORNEYS

INVENTOR.
Harold A. McMaster
BY
Barnard, McNenny & Living
ATTORNEYS

Dec. 23, 1969   H. A. McMASTER   3,485,612
METHOD AND APPARATUS FOR HEAT TREATING GLASS
ON A GAS SUPPORT BED
Filed May 9, 1966   5 Sheets-Sheet 5
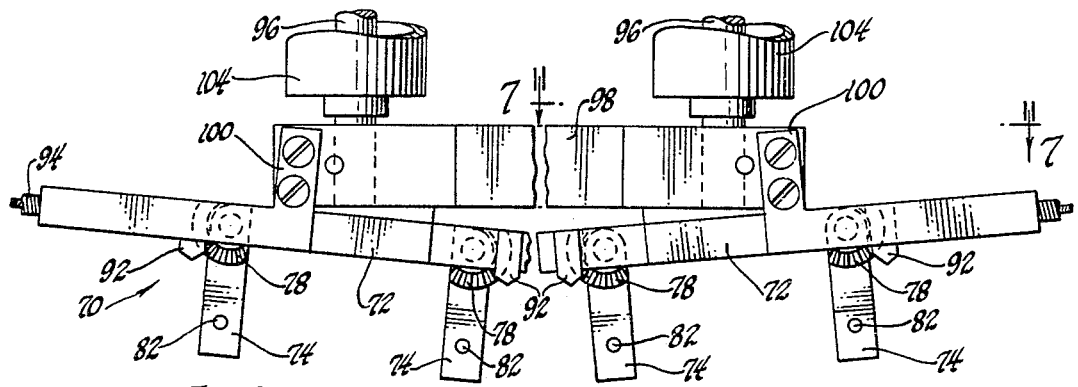
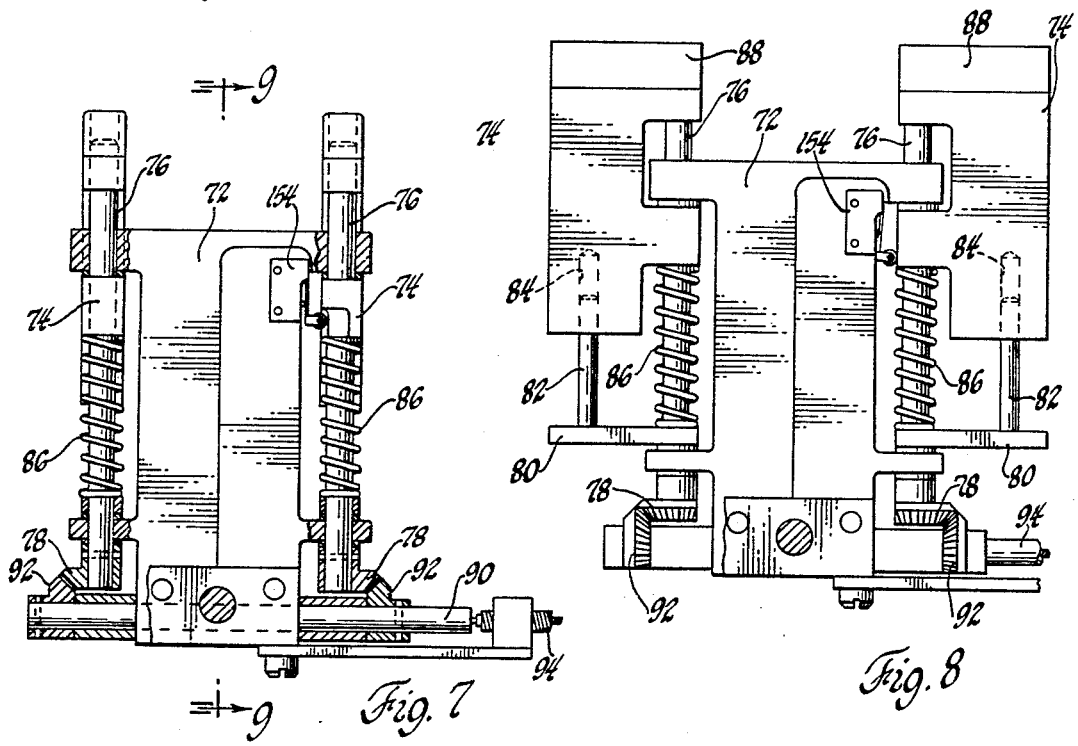
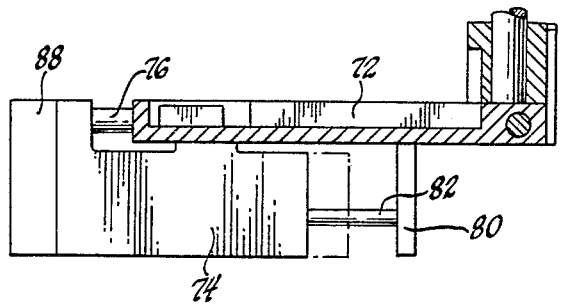
INVENTOR.
Harold A. McMaster
BY
Barnard, McGlynn & Reising
ATTORNEYS United States Patent Office 3,485,612
Patented Dec. 23, 1969

3,485,612
METHOD AND APPARATUS FOR HEAT TREATING GLASS ON A GAS SUPPORT BED
Harold A. McMaster, Woodville, Ohio, assignor to Permaglass Inc., Woodville, Ohio, a corporation of Ohio
Filed May 9, 1966, Ser. No. 548,752
Int. Cl. C03b 39/00, 27/00
U.S. Cl. 65—25                 19 Claims

ABSTRACT OF THE DISCLOSURE

A method and apparatus for transferring heat between a sheet of glass and a fluid and, more specifically, to a flow control means for directing fluid against the sheet as the sheet floats on the fluid and means for providing repetitive relative movement between the sheet and the flow control means whereby the transfer of heat between the glass and the fluid is substantially uniform over the entire sheet.

---

In the tempering of a sheet of glass, it is desirable to uniformly temper the glass over the entire surface. However, to accomplish such a uniform temper in a sheet of glass, it is necessary to establish a uniform transfer of heat from the glass to the fluid over the entire area of the glass during the period of tempering. In addition to the mass flow rate of cool fluid contacting the glass, the tempering of glass also depends upon the area of glass impinged by the fluid. In other words, a maximum amount of heat is transferred from the glass to the fluid when fluid is impinged against the glass. When fluid is not impinged against the glass, as when the fluid travels parallel to the glass, an insulating boundary layer film is formed on the glass surface and greatly reduces the heat transfer from the glass to the fluid. It is, however, impossible to simultaneously impinge the entire area of the glass with fluid because there must be an exhaust route for the fluid to follow after it has impinged the glass. That is to say, if a large area of a sheet of glass is simultaneously impinged with fluid flow, the fluid, after having impinged the glass, moves parallel to the glass toward an area of low pressure, hence forming an insulating boundary layer film at the surface of the glass which in turn reduces the impingement and prevents the uniform tempering over the entire surface of the glass.

Consequently, systems of the type heretofore utilized for tempering glass have employed a plurality of inlets to impinge fluid upon the glass and a plurality of exhausts disposed adjacent the inlets so that once the fluid has impinged the glass it moves to the exhausts. In order to prevent localized areas of high heat transfer where the fluid from the inlets impinges the glass and provide uniform fluid impingement over the entire area of the glass, such systems utilize a very long bed having inlets and exhausts and means for moving the sheet of glass along the bed so that fluid ejected from each inlet successively impinges a different area of the glass. Such systems have the disadvantage of being very large and hence very expensive.

Accordingly, it is an object and feature of this invention to provide a method and apparatus for transferring heat between a sheet of glass and a fluid by repetitively moving the sheet of glass back and forth over a flow control means having a plurality of inlets for directing fluid to impinge the sheet of glass while supporting the sheet on the fluid.

Another object and feature of the instant invention is to provide a method and apparatus for transferring heat between a sheet of glass and a fluid by floating or supporting the sheet on a blanket of hot fluid at an angle with the horizontal so that gravity urges the sheet to move in a first direction and thereafter allowing the sheet to float in the first direction under the force of gravity to a position where the sheet is floated on cool fluid being supplied by a plurality of supply zones and repetitively moving the sheet over the supply zones so that the area of the sheet contacted by the fluid from each supply zone constantly changes to uniformly transfer heat from the sheet to the cool fluid.

In general, these and other objects and features of this invention may be attained by an apparatus including a blasthead for floating a sheet of glass on fluid for removing heat therefrom and including first and second flow directing units each having a plurality of fluid inlets and a plurality of fluid exhausts. The flow directing units are disposed in opposing spaced relationship so that the sheet is impinged by and floated on fluid from the lower unit and is impinged by fluid from the upper unit. There is also included a furnace for heating the sheet and transferring the sheet to the blasthead. The furnace includes a bed having inlets and exhausts for floating the sheet over the bed on fluid as the sheet is heated. A first pair of fingers is disposed between the furnace and the blasthead, these fingers being retractable to a position out of the path of the floating sheet whereby the sheet may float from the furnace into the blasthead. A second pair of fingers is disposed on the other side of the blasthead, which fingers are retractable to a position out of the path of the floating sheet whereby the sheet may be floated out of the blasthead. There is also included actuation means for moving each pair of fingers in response to contact thereof with the sheet to thereby move each respective pair of fingers so that the sheet is moved toward the other pair of fingers. Hence, the pairs of fingers constitute means for providing repetitive relative movement between the sheet and the flow directing units. The actuation means also sequentially and independently retracts each pair of fingers to a position out of the path of the floating sheet. The first pair of fingers is in the retracted position out of the path of the sheet when the sheet is being heated in the furnace. When the sheet has been heated to a predetermined temperature, it is floated from the furnace past the first pair of fingers and into the blasthead and contacts the second pair of fingers. The actuation means responds to a signal resulting from the contact between the sheet and the second pair of fingers to move the first pair of fingers from the retracted position to a position for contacting the sheet of glass and at the same time moves the second pair of fingers to move the floating sheet toward the first pair of fingers. The actuation means responds to contact between the sheet and the first pair of fingers to move the first pair of fingers in a manner to move the sheet in the opposite direction toward the second pair of fingers. Thus, the floating sheet of glass is moved back and forth between the first pair of fingers and the second pair of fingers to accomplish a uniform transfer of heat over the entire area of glass to the fluid being impinged upon the glass from the inlets in the flow directing units of the blasthead. After a predetermined period, the actuation means moves the second pair of fingers to the retracted position so that the sheet of glass may be moved out of the blasthead. After the sheet of glass has been removed from the blasthead, the actuation means returns the second pair of fingers to the position for engaging the sheet of glass and moves the first pair of fingers to the retracted position to allow the next sheet of glass to float from the furnace into the blasthead. Preferably, the bed in the furnace and the units in the blasthead abut and are disposed at an angle with the horizontal so that the floating sheet of glass is urged by gravity to float from the furnace into the blasthead. A stop means is utilized in the furnace to prevent the floating sheet of glass from floating out of the furnace while being heated. Once the sheet of glass has been heated to the required temperature, the stop means allows the sheet of glass to float under the force of gravity from the furnace and into the blasthead where it contacts the second pair of fingers which are disposed on the side of the blasthead opposite to the furnace. In some environments, the first pair of fingers between the furnace and the blasthead need not be utilized if the flow directing units in the blasthead are positioned to provide a sufficient gravitational force urging the sheet of glass to float toward the second pair of fingers on the outward side of the blasthead. In other words, the floating sheet of glass may float into the blasthead and contact the second pair of fingers on the outward side of the blasthead so that the sheet of glass is moved in the opposite direction against the force of gravity. The sheet of glass moves against the force of gravity and across the blasthead until its momentum expires and gravity causes the sheet to move in the opposite direction to again contact the second pair of fingers. Thus, the sheet of glass may be moved back and forth in the blasthead by movement in one direction by a pair of fingers and movement in the opposite direction under the force of gravity when the units in the blasthead are disposed at an angle to the horizontal whereby a gravitational force urges the sheet to move toward the outward side of the blasthead.

Other objects and attendant advantages of the present invention will be readily appreciated as the same becomes better understood by reference to the following detailed description when considered in connection with the accompanying drawings wherein:

FIGURE 6 is an enlarged view partially broken away of a pair of finger means for oscillating a sheet of glass in accordance with the instant invention;

FIGURE 7 is a cross-sectional view partially broken away and taken substantially along line 7—7 of FIGURE 6;

FIGURE 8 is a view similar to FIGURE 7 but showing the finger means in the retracted position; and FIGURE 9 is a cross-sectional view taken substantially along line 9—9 of FIGURE 7.

Figure 1:
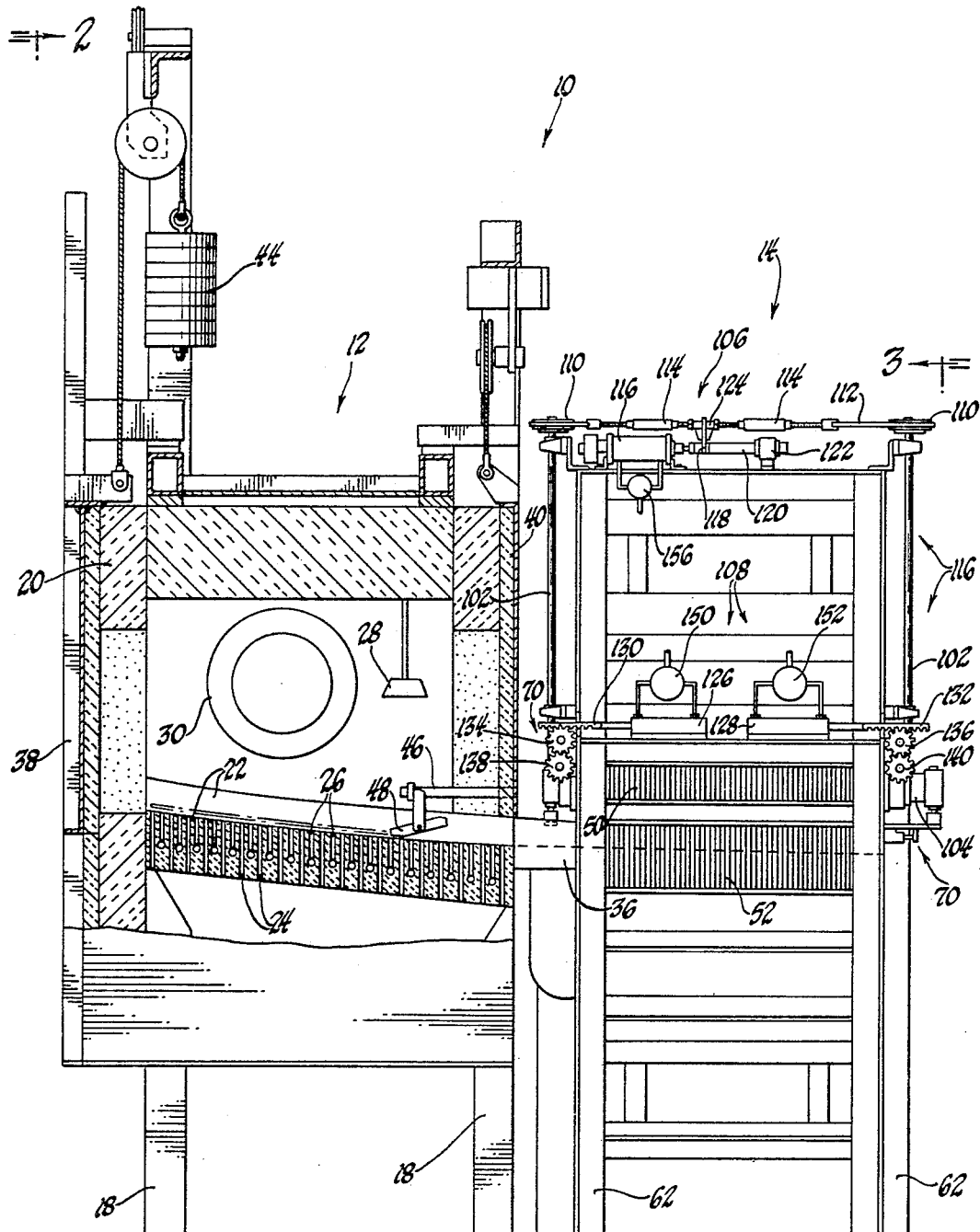
FIGURE 1 is an end view partially broken away and in cross section of a preferred embodiment of an apparatus constructed in accordance with the instant invention.
Figure 2:
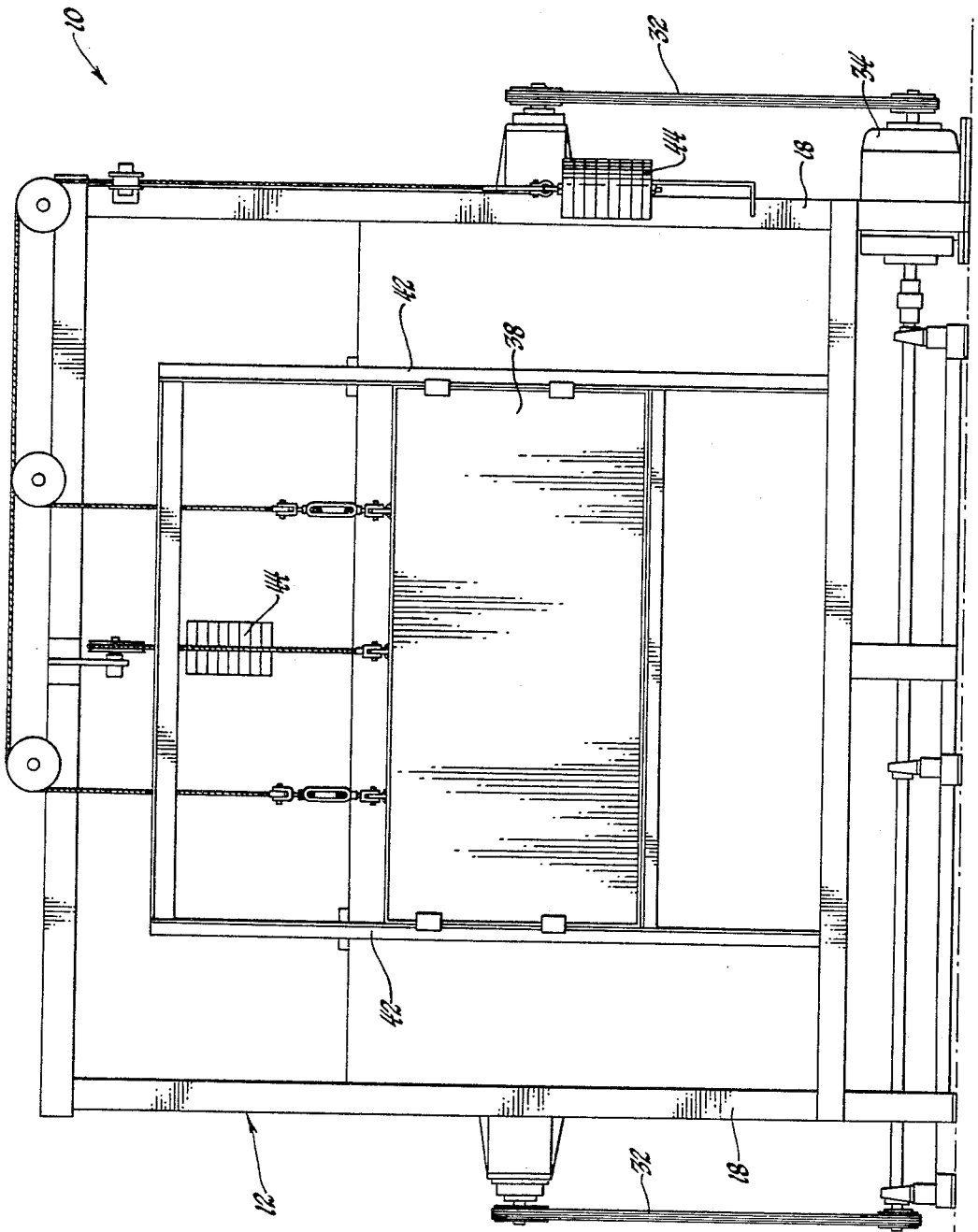
FIGURE 2 is an elevational view taken substantially along line 2—2 of FIGURE 1.
Figure 3:
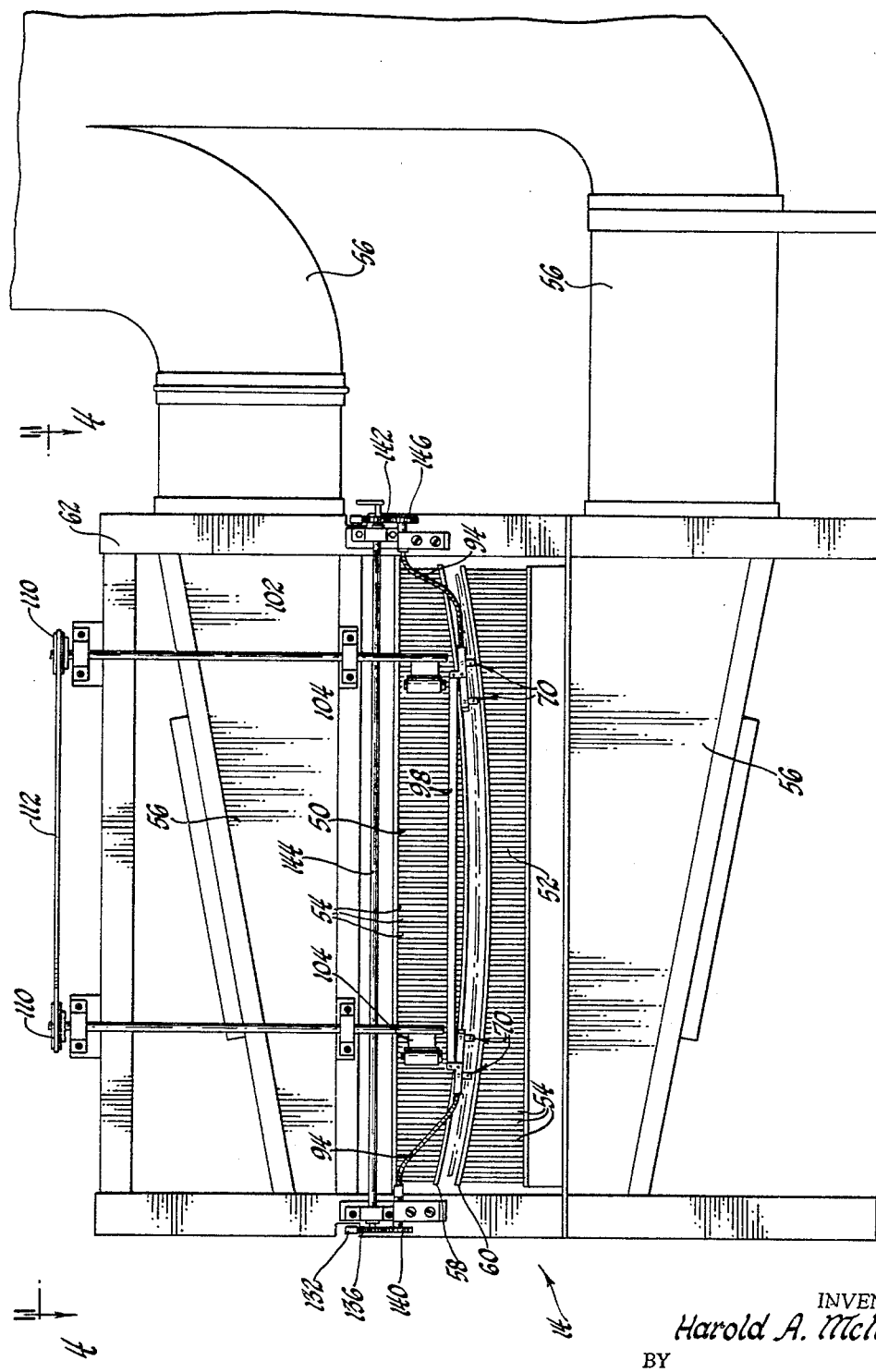
FIGURE 3 is an elevational view taken substantially along line 3—3 of FIGURE 1.
Figure 4:
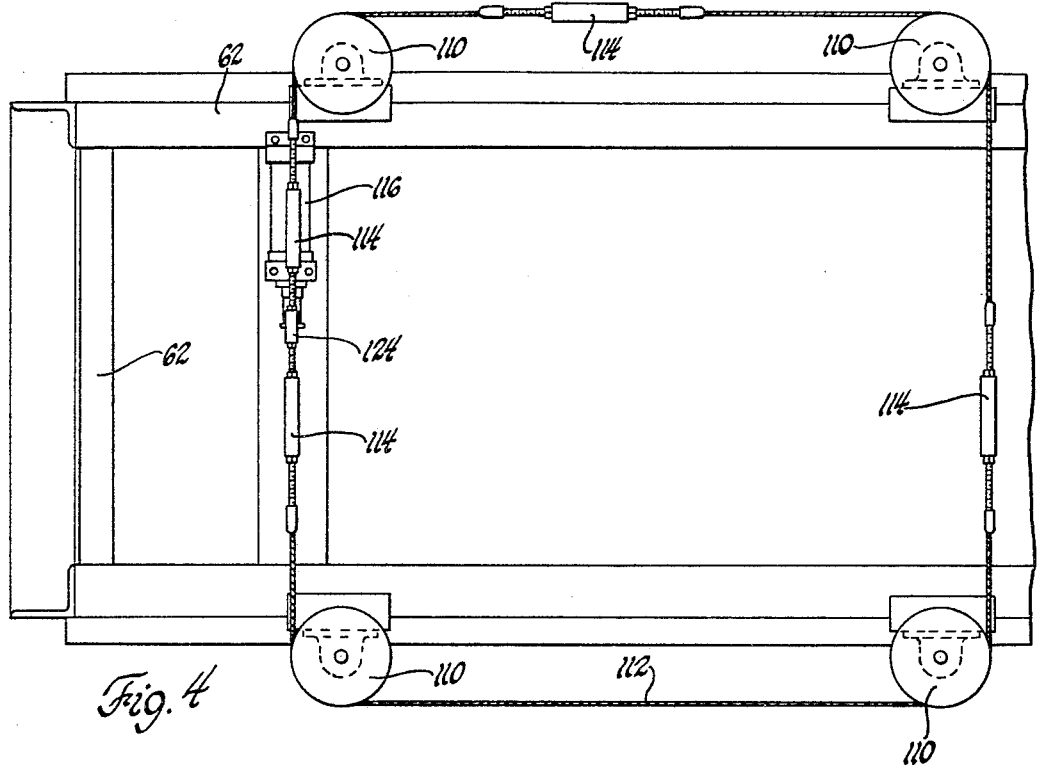
FIGURE 4 is a plan view taken substantially along line 4—4 of FIGURE 3.

Referring to the drawings, wherein like numerals indicate like or corresponding parts throughout the several views, an apparatus for transferring heat between a sheet of material such as glass and a fluid is generally shown at 10. The apparatus 10 transfers heat between a sheet of glass and a fluid and is of the type including a support bed disposed generaly horizontally and means for supplying fluid over the support bed for supporting the sheet generally horizontaly above the support bed to effect the heat transfer. The apparatus 10 comprises the furnace means 12, the blasthead 14, first means for engaging the sheet at one edge thereof to move the sheet in one direction, second means for applying a force to the sheet in the opposite direction to move the sheet in the opposite direction so that the sheet is moved in a path back and forth over at least a portion of the support bed, and third means for controlling the movement of the first means in a cyclic-like pattern to move the sheet in the path. In the preferred embodiment illustrated in the drawings there is shown, generaly at 16, means for engaging and moving a fluid supported sheet. The means 16 is indicated as such for description purposes and includes components on each side of the blasthead for engaging the sheet, but it is to be understood that in one modification the first means for engaging the sheet may be the components on one side of the blasthead and the second means for applying a force to the sheet may be the components on the opposite side of the blasthead, while in another modification the components may be disposed only on one side of the blasthead to define the first means and the second means for applying a force to the sheet may be defined by means supporting the support bed in a disposition so that the generally horizontal sheet is supported on fluid at an angle to the horizontal so that gravity applies the force to urge the sheet to move in the direction toward the first means. The means 16 also includes the third means for controlling the movement of the first means, all of which will become clear as the description proceeds.

The furnace means 12 heats the sheet of glass and transfers the sheet to the blasthead 14. The furnace means includes the structural members 18 for supporting the insulating material 20, which is preferably made of sintered fused quartz, ceramic, or the like.

A bed 22 is disposed in the furnace means and has a plurality of inlets 24 and a plurality of exhausts 26 for supporting or floating a sheet of glass over the bed on fluid ejected from the inlets 24. One or more burners 28 are provided for heating the sheet of glass. The bed 22 is concave and is disposed at an angle with the horizontal so that a sheet of glass supported on fluid thereover is urged by gravity to float toward the blasthead 14. In other words, the structural members of the furnace means 12 define means supporting the bed 22 in a disposition so that the generally horizontal sheet is supported on fluid at an angle to the horizontal so that gravity urges the sheet to move toward one side thereof. It will be appreciated that the sheet is supported at a relatively small angle relative to the horizontal and is, therefore, generally horizontal. The blowers 30 (only one shown) are disposed at each end of the furnace for recirculating the fluid through the inlets 24. The blowers 30 are driven by the belts 32 and the motors 34. The bed 22 has an extending portion 36 to form a continuous fluid support for a sheet of glass to float upon as it moves from the furnace means 12 into the blasthead 14.

The furnace means 12 includes a forward door 38 and a rear door 40. The door 38 moves upwardly along the guide tracks 42 so that a sheet of glass may be placed through the opening uncovered by the door 38 and onto the bed 22. The weights 44 are connected to the door 38 through cords so that the door 38 may be easily raised and lowered. The door 38, as well as the door 40, may be raised and lowered either manually or by an appropriate drive (not shown). The door 40 is also connected to weights (not shown) to ease the raising and lowering of the door. A stop means 46 is attached to the door 40 and prevents the sheet of glass from floating out of the furnace means 12 and into the blasthead 14 while the sheet is being heated. The stop means 46 includes a pivotal member 48 which engages an edge of the sheet of glass to prevent the sheet from floating under the force of gravity toward the blasthead 14. The door 40 is closed or in the lowered position when the sheet is being heated, and when the sheet has been heated to the required temperature the door 40 is raised. Thus, the pivotal member 48 is disengaged from the edge of the sheet of glass to allow the sheet of glass to float through the opening in the furnace means 12 uncovered by the door 40 and over the extending portion of the bed 36 and into the blasthead 14 under the force of gravity.

The blasthead 14 includes the upper and lower flow directing units 50 and 52 and each unit has a plurality of spaced fluid inlets formed by the tubes 54. The fluid inlets 54 are suplied fluid through the ducts 56 so that fluid flows through the tubes 54 and impinges upon the sheet of glass floating in the space between the units 50 and 52. The opposing walls 58 and 60 of the respective units 50 and 52 have exhaust apertures therein so that fluid is exhausted from the space between the units through the exhaust passages and between the tubes 54 to atmosphere. The units 50 and 52 are disposed in opposed vertically spaced relationship so that a sheet of glass is floated on fluid above the lower unit 52 while being subjected to fluid from the upper unit 50. As illustrated, the units 50 and 52 form a space therebetween which is concave. In addition, and as best illustrated by the dotted lines in FIGURE 1 indicating the mid-portion of the respective walls 58 and 60, the units 50 and 52 are disposed for floating the sheet at an angle to the horizontal so that gravity urges the sheet to move toward the outward side of the blasthead 14. The units 50 and 52, the duct 56, and other mechanisms to be described hereinafter are all supported by the framework 62 of the blasthead 14. The bed 22 of the furnace means 12 and its extension 36 and the lower unit 52 of the blasthead 14 comprise a support bed which is disposed generally horizontally and extends from the furnace means and into the blasthead so that the sheet is supported on fluid as it is transferred from the furnace means to the blasthead.

It will be understood that the bed 22 in the furnace means 12 and the units 50 and 52 in the blasthead 14 may utilize various inlet and exhaust patterns. For example, either or both of the units 50 and 52 and/or the bed 22 may take the form of any one of the flow control means for supporting a sheet that are covered in applications Ser. No. 548,737 filed May 9, 1966 in the name of Ronald A. McMaster and assigned to the assignee of the instant invention, Ser. No. 548,532 filed May 9, 1966 in the names of Harold A. McMaster and Ronald A. McMaster and assigneed to the asignee of the instant invention, and Ser. No. 548,754 filed May 9, 1966 in the name of Harold A. McMaster and assigned to the assignee of the instant invention.

The means 16 for providing repetitive relative movement of the sheet of glass includes a plurality of finger means, generally indicated at 70, for moving the floating sheet and retractable to a position out of the path of the floating sheet whereby the sheet may float past the finger means 70. As best illustrated in FIGURES 6 through 9, each finger means 70 includes a mount 72 and a pair of members 74 slidably and rotatably connected to the mount 72. Each member 74 is slidably and rotatably secured to a support shaft 76, and each support shaft 76 is rotatably supported in the mount 72. A bevel gear 78 is secured to one end of the support shaft 76. A link 80 is secured to the support shaft 76 so as to rotate with the support shaft 76 and supports the pin 82. The pin 82 is slidably disposed in a bore 84 in the member 74. Biasing means comprising the spring 86 interconnects the mount 72, by engaging the link 80, and the member 74 for urging the member 74 to slide to an extreme position so that the spring 86 allows the member 74 to slide along the support shaft 76 and the pin 82 relative to the mount 72 from the extreme position when a sheet of glass contacts the member 74. Each member 74 preferably includes a resilient means 88 for cushioning the contact with the sheet of glass and the resilient means 88 may be made of soft rubber, or the like. Each member 74 is, therefore, rotatable about the axis of the support shaft 76, which is also the axis along which the member 74 slides. A shaft 90 extends through each of the mounts 72 and rotates the beveled gears 92 which in turn engage the beveled gears 78. Each shaft 90 is driven by a flexible motion transmitting cable assembly 94. Normally, the members 74 are disposed in a substantially vertical position, as illustrated in FIGURES 3, 6, 7 and 9, for engaging the sheet of glass. The members 74, however, may be rotated to a retracted position and out of the path of the floating sheet of glass so that the sheet may float past the members 74. The members 74 are retracted as the shaft 90 is rotated which in turn rotates the shaft 86 through the gears 78 and 92. As the shaft 86 rotates, the link 80 is moved to move the pin 82 which in turn rotates each respective member 74. The members 74 are shown in the retracted position in FIGURE 8 and, as illustrated in FIGURE 1, the finger means disposed between the blasthead 14 and the furnace means 12 are disposed in the retracted position so that a sheet of glass may float out of the furnace means 12 and into the blasthead 14.

A rod 96 is secured to each mount through the crossbar 98 and the flange 100 extending from the mount 72 and bolted to the crossbar 98. As is most clearly illustrated in FIGURES 3 and 6, the crossbar 98 interconnects two rods 96 so that the members 74 of a pair of finger means 70 will move into and nearly out of the space between the units 50 and 52. A plurality of drive shafts 102 are rotatably supported on the blasthead 14 and an arm 104 extends from each shaft for rotatably supporting a rod 96. As each drive shaft 102 rotates, the arm 104 is rotated to move the rods 96 closer to or farther away from the blasthead 14, thus moving the members 74 into and nearly out of the space between the units 50 and 52.

The third means for controlling the first means includes actuation means for sequentially moving the finger means 70 in response to contact between the sheet of glass and the respective finger means 70 to move the sheet away from the finger means contacted and, in addition, to retract the finger means 70 to a position out of the path of the sheet. The actuation means includes the sequencing means, illustrated in FIGURE 5, the first drive means generally shown at 106, and the second drive means generally shown at 108. The sequencing means detects contact between the sheet of glass and each of the members 74 of the finger means 70 and sends signals to the first and second drive means 106 and 108 for sequencing the system. The first drive means 106 rotates the drive shafts 102 in response to a signal from the sequencing means, and the second drive means rotates the members 74 to retract the members out of the path of the sheet in response to signals from the sequencing means.

More specifically, the first drive means 106 includes a sprocket 110 secured to the upper end of each of the drive shafts 102. A length of bicycle-type chain 112 is disposed about each of the sprockets 110, and the respective lengths of bicycle chain 112 are interconnected by the turnbuckles 114. An air cylinder 116 is mounted on top of the blasthead 14 and has a plunger 118 extending therefrom and slidable along the shaft 120, which shaft 120 is supported by the support member 122. The plunger 118 is connected by the member 124 to the turnbuckles 114. The plunger 118 of the air cylinder 116 is moved back and forth as viewed in FIGURE 1 to rotate each of the sprockets 110 back and forth through an angle of something less than 90°, which in turn rotates the drive shafts 102 to move the members 74 of the finger means 70 into and nearly out of the space between the units 50 and 52.

The second drive means 108 includes the air cylinders 126 and 128 for driving the respective racks 130 and 132. The rack 130 engages the gear 134 and the rack 132 engages the gear 136. The gear 134 drives the gear 138 and the gear 136 drives the gear 140. The gear 136 is connected to the gear 142 by the shaft 144 and the gear 142 engages the gear 146. The gears 140 and 146 are operatively connected to the outward pair of finger means 70 by the flexible motion transmitting cables 94. In a like manner, the gear 134 is connected through a shaft to a gear at the opposite end of the blasthead, which in turn drives another whereby the motion transmitting cables 94 associated with the finger means 70 on the inward side of the blasthead are driven in unison. Upon actuation of the air cylinder 128 to move the rack 132, the motion transmitting cables 94 disposed on the outward side of the blasthead and illustrated in FIGURE 3 rotate the shafts 90 and gears 92 to retract the members 74 by rotating the members 74 to the horizontal position which is illustrated in FIGURE 8. The air cylinder 126 moves the rack 130 to rotate the gears 134 and 138 to move the members 74 of the finger means 70 disposed between the furnace means 12 and the blasthead 14 between a retracted horizontal position and the position for engaging a sheet of floating glass. The members 74 of the finger means 70 disposed between the furnace 12 and the blasthead 14 are illustrated in the horizontal position in FIGURE 1. The air cylinders 126 and 128 are fed by compressed air, or the like, passing through the valves 150 and 152, which valves form a part of the sequencing system.

Figure 5:
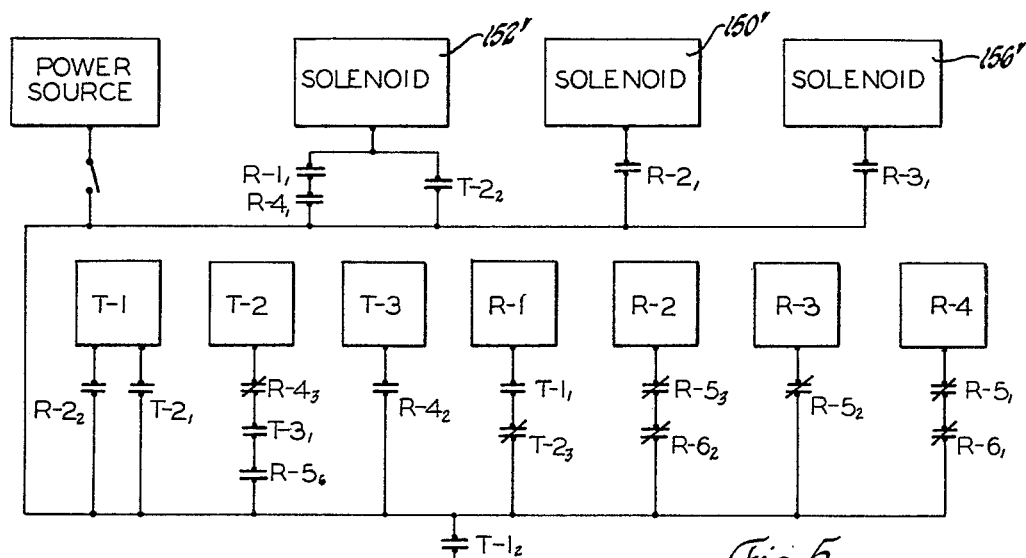
FIGURE 5 is a schematic view of the sequencing system utilized in the illustrated apparatus.

The sequencing system controls the movement of the air cylinders 116, 126 and 128 and is best illustrated in FIGURE 5. There is schematically shown a power source, solenoids 150′, 152′, 156′, the timers T–1, T–2, T–3, and the relays R–1, R–2, R–3, R–4, R–5 and R–6. The solenoids 150′, 152′ and 156′ actuate the valves 150, 152 and 156, which are shown in FIGURE 1. For example, solenoid actuated valve 150 has two positions so that upon actuation of the solenoid 150′, fluid flows to one end of the cylinder 126 and when the solenoid 150′ is not actuated, fluid flows to the other end of the cylinder 126. The same is true of the solenoid actuated valves 152 and 156. The solenoid 150′ controls the retraction of the finger means 70 disposed between the furnace 12 and the blasthead 14 and the solenoid 152′ controls the retraction of the finger means 70 disposed on the outward side of the blasthead 14, i.e., the finger means 70 shown on the right as viewed in FIGURE 1. The solenoid 156′ controls the angular movement of the drive shafts 102. For clarity, the finger means 70 disposed between the furnace 12 and blasthead 14 will be referred to as the inboard finger means and the finger means 70 disposed on the opposite side of the blasthead will be referred to as the outboard finger means.

The sequencing means illustrated in FIGURE 5 is activated by closing the switch adjacent the power source to apply power to the system. Upon actuation of the switch, power is supplied through the normally closed relay contacts R–6$_1$ and R–5$_1$ to energize the relay R–4. (R–5$_1$ indicates the contact points are in the relay R–5, the slant through the contacts in the schematic illustrates contacts which are closed when the particular relay is not energized.) Current flows through the normally closed contacts R–5$_2$ to energize the relay R–3 and current flows through the normally closed contacts R–6$_2$ and R–5$_3$ to energize the relay R–2. When relay R–2 is energized, the relay contacts R–2$_1$ thereof are closed so that current flows to the solenoid 150′ which in turn moves the inboard finger means 70 to the retracted position illustrated in FIGURE 8 so that a sheet of glass may float thereby. When the relay R–3 is activated, the contact points R–3$_1$ are closed to energize the solenoid 156′ which rotates the drive shafts 102 to move the arms 104, which are attached to the outboard finger means 70, away from the blasthead 14 while moving the arm means 104, which are attached to the inboard finger means 70, toward the blasthead 14, which positions are illustrated in FIGURE 1.

Also, when relay R–2 is energized, the contacts R–2$_3$ are closed to energize the timer T–1. The three timers are of the type that begin a timing period upon being deenergized so that a normally open set of contacts thereof remain closed a set period of time after current stops flowing to the timer. The contact points R–4$_2$ are closed to energize the timer T–3 when relay R–4 is energized. When timer T–1 is energized, the contacts thereof T–1$_1$ are closed to energize relay R–1. Upon the energization of relay R–1, the contacts R–1$_1$ thereof are closed, and since relay R–4 has already been energized the contacts R–4$_1$ are closed thereby allowing current to flow to the solenoid 152′ to move the outboard finger means 70 to the vertical or glass-engaging position.

When the timer T–1 is energized by closing the contacts R–2$_3$, the contacts T–1$_2$ are closed.

At this stage, therefore, the solenoids 150′, 152′ and 156′ have been energized so that the inboard finger means 70 are in the retracted position to allow the sheet of glass to float out of the furnace 12 and into the blasthead 14, and the outboard finger means 70 have been positioned vertically for engaging the sheet of glass and the drive shafts 102 have been rotated so that the arms 104 associated with the outboard finger means 70 are moved away from the blasthead so that the finger means 70 on the outboard side of the blasthead are nearly out of the space between the units 50 and 52. The glass floats into the blasthead between the units 50 and 52 and contacts the members 74 of the outboard finger means 70 to actuate the microswitch 154. (Each pair of finger means 70 may utilize a microswitch 154; however, only one microswitch has been illustrated schematically for each side of the blasthead and microswitch 154 in FIGURE 5 is associated with the finger means 70 on the outboard side of the blasthead and the microswitch 154′ is associated with the finger means 70 on the inboard side of the blasthead.) As the glass contacts the members 74 of the outboard finger means 70, the microswitch 154 is closed and relay R–5 is energized to close contacts R–5$_4$ so that current flows through the contacts R–5$_4$ and the normally closed contacts R–6$_3$ to maintain the relay R–5 energized even when the glass moves away from and releases or opens the microswitch 154. Upon the energization of relay R–5, the normally closed contacts R–5$_3$ are opened to deenergize relay R–2, which in turn opens the contacts R–2$_1$ to de-energize the solenoid 150′. Upon de-energization of the solenoid valve 150′, the finger means 70 on the inboard side of the blasthead are moved from the retracted position to a position in the path of the glass for contacting the glass. At the same time, the normally closed contacts R–5$_2$ are opened to de-energize relay R–3, which in turn opens the contacts R–3$_1$ to de-energize the solenoid 156′. Upon de-energizing the solenoid 156′, the shafts 102 are rotated to move the arms 104 on the outboard side of the blasthead toward the blasthead to move the outboard finger means 70 farther into the space between the units 50 and 52, thus pushing the floating sheet of glass toward the inboard finger means 70 and to move the arms 104 on the inboard side away from the blasthead.

When relay R–5 is energized, the normally closed contacts R–5$_1$ are opened to de-energize relay R–4, which in turn opens contacts R–4$_2$ to stop current flow to timer T–3. The contacts T–3$_1$ remain closed for a set period after timer T–3 is de-energized. Also, the contacts R–4$_3$ are closed and contacts R–5$_6$ are closed when relay R–5 is energized, thus timer T–2 is energized. Upon the energization of timer T–2, the contacts thereof T–2$_1$ are closed to maintain the timer T–1 energized since the relay R–2 has been de-energized upon the opening of the contacts R–2$_2$. Also, the contacts T–2$_2$ are closed when the timer T–2 is energized to maintain the solenoid 152′ energized to maintain the outboard finger means 70 in the glass-engaging position since the relay contacts R–4$_1$ are opened upon de-energization of the relay R–4. The contacts T–2$_3$ are opened when the timer T–2 ie energized to de-energize the relay R–1, thus also opening the contacts R–1$_1$.

At this stage, the floating sheet of glass moves toward the inboard finger means 70 and upon contacting the inboard finger means 70 the microswitch 154′ is closed to energize relay R–6. When relay R–6 is energized, the relay contacts R–6$_4$ are closed and the contacts R–6$_3$ are opened to de-energize relay R–5 to close contacts R–5$_5$ so that current flows through the contacts R–6$_4$ and R–5$_5$ to maintain the relay R–6 energized when the microswitch 154′ is opened. When relay R–5 is de-energized, the contacts R–5$_1$ close; however, the contacts R–6$_1$ are opened when relay R–6 is energized so that the relay R–4 remains de-energized. Also, when relay R–5 is de-energized, contacts R–5$_2$ close to energize relay R–3 which in turn closes contacts R–3$_1$ to energize the solenoid 156′ which in turn moves the arms 104 associated with the inboard finger means 70 into the space between the units 50 and 52 to push the sheet of glass toward the outboard finger means 70 and at the same time moves the arms 104 away from the blasthead. Relay R-2 remains de-energized to maintain the inboard finger means 70 in the lowered position to contact the glass because the contacts R-6$_2$ are opened as relay R-6 is energized even though contacts R-5$_3$ are closed.

The timer T-3 runs its set period a short time after the glass contacts the outboard finger means 70 for the first time to open the contacts T-3$_1$ to prevent the timer T-2 from being re-energized when the sheet contacts the microswitch 154 of the outboard finger means 70 the second time but the contacts T-3$_1$ remain closed long enough to allow the timer T-2 to be energized when relay R-5 is energized even though current stops flowing to timer T-3 when relay R-5 is energized. Thus, current flow to timer T-2 is stopped by the opening of contacts T-3$_1$ when timer T-3 runs its set period. When current stops flowing to timer T-2, timer T-2 begins to run its set period.

At this stage, the glass sheet is moved back and forth between opposite sides of the blasthead by the inboard and outboard finger means 70 until the timer T-2 runs its period, at which time it is de-energized to open the contacts T-2$_2$ to de-energize the solenoid 152' to move the outboard finger means 70 to the retracted position out of the path of the glass so that the glass sheet may be moved out of the blasthead on the outboard side of the blasthead. At the same time, the contacts T-2$_1$ are opened stopping current flow to the timer T-1 so that the timer T-1 begins to run its set period. The contacts T-2$_3$ close when the timer T-2 runs its period, but at that time, the timer T-1 is still energized so that the contacts T-1$_1$ remain open to prevent current flow to the relay R-1 and therefore maintains the outboard finger means 70 in the retracted position.

The contacts T-1$_2$ remain closed as long as the timer T-1 runs its period; thus, current is available for the relays R-5 and R-6. Hence, if the timer T-2 runs its period when the glass sheet is approaching the outboard finger means 70, the sheet will merely pass out of the outboard side of the blasthead. However, if the sheet of glass is approaching the inboard finger means 70 when the timer T-2 runs its period, the sheet will contact the microswitch 154' of the inboard finger means 70 to open the contacts R-5$_2$ to de-energize the relay R-3 and open the contacts R-3$_1$ to de-energize the solenoid 156' so that the shafts 102 are rotated to move the inboard arms 104 toward the blasthead to move the sheet of glass back toward the outboard side of the blasthead. The timer T-1 provides a sufficient period for the glass to be removed from the blasthead before running its period to open the contacts T-1$_2$ to prevent current flow to relays R-5 and R-6. When both relays R-5 and R-6 are de-energized, relay R-4 is again energized, relay R-3 is again energized, and relay R-2 is again energized so that the inboard finger means 70 moves to the retracted position while the arms 104 associated with the outboard finger means 70 are moved away from the blasthead and the inboard arms 104 are moved toward the blasthead. When relay R-2 is energized, the contacts R-2$_2$ are closed to energize the relay T-1 which in turn closes the contacts T-1$_1$ to energize the relay R-1, thus energizing solenoid 152' to move the outboard finger means to the vertical glass-engaging position thereby placing the system in its initial condition to receive and repeat the sequence with the next sheet of glass.

As alluded to previously, a pair of finger means may be disposed on each side of the blasthead to define the first and second means or the apparatus may utilize only the finger means on the exit side of the blasthead to define the first means with the second means for applying force to the sheet in the opposite direction being defined by means disposing the lower unit 52 in such a disposition that the sheet is supported on fluid at an angle to the horizontal so that gravity is the force urging the sheet to move back toward the first means.

It will be understood, of course, that the schematically illustrated sequencing system is one of various systems which may be utilized to control the apparatus and it is within the scope of the present invention to utilize such variations.

The invention has been described in an illustrative manner and it is to be understood that the terminology which has been used is intended to be in the nature of words of description rather than of limitation.

The embodiments of the invention in which an exclusive property or privilege is claimed are defined as follows:

1. In an apparatus for transferring heat between a sheet of material such as glass and a fluid including a support bed disposed generally horizontally and means for supplying fluid over said bed for supporting the sheet generally horizontally above said bed to transfer heat between the sheet and the fluid, the improvement comprising; first means for engaging the sheet at one edge thereof to move the sheet in one direction, second means for applying a force to the sheet in the opposite direction to move the sheet in the opposite direction so that the sheet is moved in a path back and forth over at least a portion of the support bed, and third means for controlling the movement of said first means in a cyclic-like pattern to move the sheet in said path.

2. In an apparatus as set forth in claim 1 wherein said support bed includes inlet passages for conveying fluid to the sheet whereby the fluid ejected from each inlet passage is directed toward different areas of the sheet as said movement occurs.

3. In an apparatus as set forth in claim 2 wherein said first means includes at least one finger means for moving the fluid supported sheet over said inlet passages, and said third means includes actuation means for sequentially moving said finger means in response to contact between the sheet and said finger means to move the sheet away from said finger means.

4. In an apparatus as set forth in claim 3 wherein said second means includes second finger means and each of said first and second finger means is sequenced by said actuation means in response to contact of the sheet with each respective finger means whereby the glass is moved back and forth between said finger means.

5. In an apparatus as set forth in claim 3 wherein said finger means is retractable to a position out of the path of the sheet and said actuation means retracts said finger means to a position out of the path of the sheet.

6. In an apparatus as set forth in claim 5 wherein said finger means includes a mount, at least one member slidably and rotatably connected to said mount, and biasing means interconnecting said mount and said member for urging said member to slide to an extreme position whereby said biasing means allows said member to slide relative to said mount from said extreme position when the sheet contacts said member, said member being rotatable about an axis parallel to the direction of sliding movement thereof so that said member may be rotated and retracted to a position out of the path of the fluid supported sheet whereby the sheet may move past said member.

7. In an apparatus as set forth in claim 6 including a resilient means disposed on said member for cushioning the contact with the sheet, a rod secured to said mount, a rotatably supported shaft, an arm extending from said shaft and rotatably supporting said rod so that said member moves the sheet when said shaft rotates, wherein said actuation means includes sequencing means for detecting contact between the sheet and said member, first drive means for rotating said shaft in response to a signal from said sequencing means, and second drive means for rotating said member to retract said member of said finger means to said position out of the path of the sheet in response to signals from said sequencing means.

8. In an apparatus as set forth in claim 2 wherein said second means supports said support bed in a disposition so that the generally horizontal sheet is supported on fluid at an angle to the horizontal so that gravity urges the sheet to move toward a first side thereof, said first means being disposed adjacent said first side for moving the sheet against the force of gravity so that said first means moves the sheet in said one direction and gravity moves the sheet in said opposite direction to provide said movement.

9. In an apparatus as set forth in claim 2 including a blasthead to support the sheet on fluid for removing heat from the sheet, said blasthead including first and second flow directing units with a plurality of said inlet passages disposed therein, said units being disposed in opposed vertically spaced relationship so that the sheet is supported on fluid above the lower unit and is subjected to fluid from said inlet passages of the upper unit, and furnace means for heating the sheet and for transferring the sheet to said blasthead, said lower unit defines a portion of said support bed so that said support bed extends from said furnace means and into said blasthead so that the sheet is supported on fluid as it is transferred from said furnace means to said blasthead.

10. In an apparatus as set forth in claim 9 wherein said first and second means comprise first and second finger means retractable to a position out of the path of the fluid supported sheet whereby the sheet may move past said finger means, and said third means includes actuation means for sequentially moving said finger means in response to contact between the sheet and said finger means to move the sheet away from each respective finger means and for retracting said finger means to said position out of the path of the fluid supported sheet, said first and second finger means being disposed on opposite sides of said blasthead so that said actuation means moves said first finger means to the retracted position so that the sheet may move past said first finger means and into the blasthead to contact said second finger means, said actuation means responding to said contact to move said first finger means to a position for contacting the glass and to move said second finger means to move the sheet toward said first finger means, said actuation means being responsive to contact between said first finger means and the sheet to move said first finger means for moving the sheet toward said second finger means whereby the sheet is moved back and forth between said first and second finger means.

11. In an apparatus as set forth in claim 9 wherein said second means supports said support bed in a disposition so that the generally horizontal sheet is supported on fluid at an angle to the horizontal so that the sheet is allowed to move from said furnace means and into the blasthead under the force of gravity, and said furnace means includes stop means for preventing the fluid supported sheet from moving out of said furnace means and into said blasthead during the heating of the sheet.

12. In an apparatus as set forth in claim 11 wherein said first means includes at least one finger means disposed on the side of said blasthead opposite said furnace means for moving the fluid supported sheet, and said third means includes actuation means for sequentially moving said finger means in response to contact between the sheet and said finger means to move the sheet away from said finger means so that the sheet moves under the force of gravity to contact said finger means, which contact is sensed by said actuation means, and said actuation means moves said finger means to move the sheet against the force of gravity whereby the movement of the sheet is caused by the sheet being moved in said opposite direction under the force of gravity and moved in said one direction by said finger means.

13. In an apparatus as set forth in claim 9 wherein said first means includes a plurality of first finger means for moving the fluid supported sheet over said inlet passages; each of said finger means comprises; a mount, at least one member slidably and rotatably connected to said mount, and biasing means interconnecting said mount and said member for urging said member to slide to an extreme position whereby said biasing means allows said member to slide relative to said mount from said extreme position when a sheet contacts said member, said member including a resilient portion for cushioning the contact with the sheet, said member being rotatable relative to said mount about an axis parallel to the direction of sliding movement thereof whereby said member may be rotated for retraction out of the path of the floating sheet.

14. In an apparatus as set forth in claim 13 wherein each finger means includes a rod secured to said mount, a shaft rotatably supported on said blasthead, and an arm extending from said shaft and rotatably supporting said rod so that said member moves the sheet when said shaft rotates, said rods of at least two of said finger means being interconnected.

15. In an apparatus as set forth in claim 14 wherein said actuation means includes sequencing means for detecting contact between the sheet and said members of said respective finger means, first drive means for rotating said shafts of said respective finger means in response to a signal from said sequencing means, and second drive means for rotating said members to retract said members of said finger means out of the path of the sheet in response to signals from said sequencing means.

16. In an apparatus as set forth in claim 15 wherein said first finger means comprises a first pair of said finger means disposed on the side of said blasthead opposite to said furnace and said second means comprises a second pair of such finger means disposed between said furnace means and said blasthead, said rods of said finger means of each of said pairs being interconnected, whereby a sheet may be heated in said furnace means as said second pair of finger means are retracted out of the path of the sheet by said second drive means in response to a signal from said sequencing means and said first pair of finger means are moved into position to contact the sheet by said second drive means in response to a signal from said sequencing means so that the fluid supported sheet moves past said second pair of finger means and into said blasthead to contact said first pair of finger means, which contact is detected by said sequencing means to send a signal to said second drive means for moving said second pair of finger means into the path of the sheet and to send a signal to said first drive means for moving said first pair of finger means to move the sheet to contact said second pair of finger means, which contact is detected by said sequencing to a signal from said sequencing means so that fluid means to send a signal to said first drive means for moving the sheet to contact said first pair of finger means thereby repetitively moving the sheet back and forth between opposite sides of said blasthead for a predetermined period as controlled by said sequencing means, said sequencing means sends a signal to said second drive means at the end of said predetermined period to retract said first pair of finger means out of the path of the sheet to allow the sheet to move out of said blasthead.

17. In a method of transferring heat between a sheet of material such as glass and a heat exchange fluid by supplying fluid over a support bed to support the sheet in a generally horizontal disposition on fluid over the support bed and transferring heat between the sheet and the fluid, the improvement comprising; engaging the sheet at one edge with a first means to apply force to the sheet to move the sheet in one direction, applying a force to the sheet in the opposite direction to move the sheet in the opposite direction so that the sheet is moved in a path back and forth over at least a portion of the support bed, and controlling the movement of the first means to move the latter in a cyclic repetitious pattern whereby the sheet is moved in said path to effect a generally uniform transfer of heat between the sheet and the fluid over the entire area of the sheet.

18. In a method as set forth in claim 17 wherein the applying of a force to the sheet in said opposite direction is specifically attained by supporting the sheet on fluid at an angle with the horizontal so that gravity urges the sheet to float in said opposite direction.

19. In a method as set forth in claim 17 wherein the applying of a force to the sheet in said opposite direction is specifically attained by engaging the sheet with second means to apply a force to the sheet to move the sheet in said opposite direction.

References Cited

UNITED STATES PATENTS

| | | | |
|---|---|---|---|
| 2,131,406 | 9/1938 | Mosmieri et al. | 65—114 X |
| 3,338,695 | 8/1967 | Ritter | 65—104 |

ARTHUR D. KELLOGG, Primary Examiner

U.S. Cl. X.R.

65—104, 107, 114, 182, 350, 351; 214—1

UNITED STATES PATENT OFFICE
CERTIFICATE OF CORRECTION

Patent No. 3,485,612    Dated December 23, 1969

Inventor(s) H. A. McMaster

It is certified that error appears in the above-identified patent and that said Letters Patent are hereby corrected as shown below:

Column 3, line 61, "horizontaly" should be --horizontally--; column 3, line 72, "generaly" should be --generally--. Column 4, line 72, "suplied" should be --supplied--. Column 5, line 33, "assigneed" should be --assigned--; column 5, line 33, "asignee" should be --assignee--. Column 12, line 8, "reslient" should be --resilient--; column 12, line 52, delete the entire line "to a signal from said sequencing means so that fluid".

SIGNED AND SEALED
JUL 14 1970

(SEAL)
Attest:

Edward M. Fletcher, Jr.
Attesting Officer

WILLIAM E. SCHUYLER, JR.
Commissioner of Patents